Aug. 31, 1954   R. H. GERKE   2,687,976
SELF-SEALING FUEL CELLS
Filed June 26, 1951
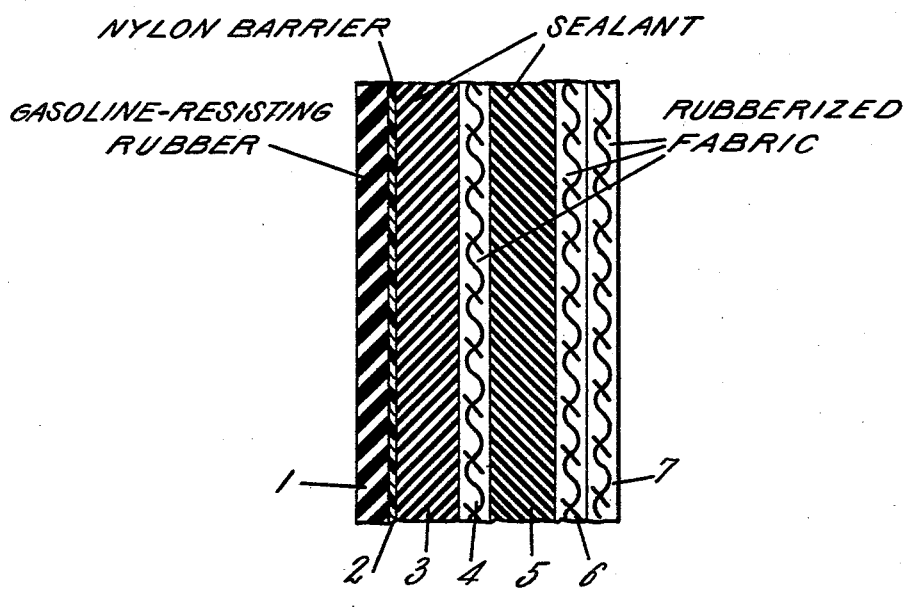
INVENTOR.
ROSCOE H. GERKE
BY
Robert J. Patterson
ATTORNEY Patented Aug. 31, 1954

2,687,976

UNITED STATES PATENT OFFICE 2,687,976

SELF-SEALING FUEL CELLS

Roscoe H. Gerke, Nutley, N. J., assignor to United States Rubber Company, New York, N. Y., a corporation of New Jersey Application June 26, 1951, Serial No. 233,668

4 Claims. (Cl. 154—43.5)

This invention relates to a self-sealing fuel cell and more particularly to an improved rubber sealant composition for such cells.

The sealant layer or layers of bullet-sealing fuel cells have in the past been made from uncured or partially cured natural rubber. A very serious disadvantage of sealant layers made of natural rubber is that they crystallize in a short time upon exposure to very low temperatures such as those encountered in the arctic regions. When such sealant layers undergo crystallization they become hard so that they are not swollen by the fuel after they are pierced by a bullet. The result is that the usefulness of such fuel cells under very low temperature conditions is seriously impaired.

Recently there has been a demand for a rubber sealant layer for self-sealing fuel cells which will not crystallize upon standing for four days at −40° C. and which will otherwise meet all of the requirements of good fuel cell sealant compositions. Since natural rubber crystallizes at −40° C. it is impossible to meet these new specifications with natural rubber.

I have discovered a synthetic rubber sealant composition which fully meets the new specifications for sealant layers and which does not crystallize or otherwise harden upon prolonged exposure to temperatures of the order of −40° C. The new sealant of my invention does not crystallize or undergo amorphous hardening at temperatures ranging from −40° C. downwardly to −50° C. Many of my sealants do not crystallize or otherwise harden at temperatures ranging as low as −60° C. or even as low as −70° C. The sealant layers of my invention are readily adaptable to use in existing methods of fuel cell construction, i. e., my sealant layers can simply be substituted for the unsatisfactory natural rubber sealant layers which have been used in comercial production up until the present time.

Broadly speaking, the sealant layer of my invention comprises a vulcanizate of a non-crystallizable synthetic rubber which is readily swollen but is not disintegrated by the fuel and p-quinone-dioxime or a carboxylic acid ester thereof as a non-sulfur vulcanizing agent therefor, the amount of the p-quinone-dioxime or ester thereof being such that the vulcanizate has a modulus of from 25 to 150 pounds per square inch at 400% elongation.

In the practice of my invention the synthetic rubber is intimately mixed with an appropriate amount of the curative agent, i. e., the p-quinone-dioxime or ester thereof at a temperature at which reaction of the curative with the rubber will not occur, whereupon the resulting mixture is calendered or otherwise formed into sheets of the desired thickness for use in the walls of the fuel cell. If desired, other compounding ingredients may be incorporated prior to the calendering step with a view to imparting desirable processing properties. For example, conventional softeners can be included in the formulation. Alternatively, or in addition, suitable proportions of coloring materials can be included for more ready identification.

The uncured calendered sheets are then assembled with other desired components (all rubber parts of which are uncured but contain curatives) into the structure of the final fuel cell whereupon the assembly is cured in the conventional manner. The sealant layer of my invention can be employed in place of the conventional natural rubber sealant layer used in the ordinary types of fuel cells.

Although the actual construction of the fuel cell forms no part of my invention, the accompanying drawing portrays diagrammatically a greatly enlarged cross-section of the wall of a typical fuel cell having two sealant layers made in accordance with the present invention. The wall of the cell embodies an inside lining layer 1 of butadiene-acrylonitrile rubbery copolymer highly resistant to attack by the fuel, a thin continuous barrier layer 2 of nylon, a sealant layer 3 prepared in accordance with my invention, a ply 4 of rayon tire fabric which has been rubberized on both sides with butadiene-acrylonitrile rubbery copolymer resistant to fuel, a second sealant layer 5 embodying my invention and two outer plies 6 and 7 identical with ply 4.

The synthetic rubber used in accordance with my invention must be non-crystallizing, i. e., it must not undergo crystallization at any temperature, however low. The synthetic rubber should also be one which does not undergo amorphous hardening in use even under extreme low temperature conditions since otherwise it would not swell and seal with the desired rapidity. Thus it should not undergo such hardening at temperatures as low as −40° C. and preferably should not undergo such hardening even when subjected to temperatures as low as −70° C.

The synthetic rubber used in the practice of my invention should have a high degree of swellability by the hydrocarbon fuels used whether such fuels be highly paraffinic or contain a large proportion of aromatics. I have found that a convenient measure of the swellability of the uncured synthetic rubber used is the "cohesive energy density" as defined by Hildebrand and Scott in "The Solubility of Nonelectrolytes" published by Reinhold, 1950, page 424 and determined by measurement of maximum swelling in solvents of known cohesive energy density. Synthetic rubbers which are suitable for use in accordance with the present invention have a cohesive energy density ranging from 56 to 72.

A wide variety of synthetic rubbers can be used in the practice of my invention. In general, I employ homopolymers of aliphatic conjugated diolefin hydrocarbons or copolymers of such diolefin hydrocarbons with copolymerizable monoolefinic compounds. Examples of such copolymers are butadiene-styrene copolymers such as ordinary GR–S. Instead of GR–S I prefer to employ copolymers of butadiene with styrene or other monomer which have substantially lower amorphous hardening temperatures than GR–S. Thus I have obtained unusually satisfactory results using the butadiene-styrene rubbery copolymer known as X–489 which is a copolymer of 95% butadiene and 5% styrene made at 122° F. and having a second order transition temperature (which is synonymous with amorphous hardening temperature) of −88° C. I have also obtained remarkable results using a rubbery copolymer of 75% butadiene and 25% isoprene made at 41° F. Still another example of a copolymer which has been unusually satisfactory is a ternary copolymer of 75% butadiene, 10% isoprene and 15% 2-ethylhexyl acrylate made at 41° F.

In addition to the foregoing specific types of synthetic rubbers, I have successfully employed polyisoprene, a copolymer of 90% butadiene and 10% 2-vinylpyridine, a terpolymer of 80% butadiene, 10% styrene and 10% isoprene made at 41° F., and a copolymer of 50% butadiene and 50% styrene.

The curative used for the synthetic rubber in accordance with my invention is either p-quinone-dioxime or a carboxylic acid ester thereof. Those skilled in the art will know which carboxylic acid esters of p-quinone-dioxime will be suitable. An example of such an ester is pp'-dibenzoylquinonedioxime. Preferably the carboxylic acid employed in forming the ester is one which does not exert an undesirable action during curing or upon the vulcanizate. The acid used is usually a monocarboxylic acid free from olefinic or acetylenic unsaturation, e. g., benzoic, salicylic or acetic acids.

The amount of the p-quinone-dioxime or ester thereof used in the practice of my invention should be so adjusted that upon vulcanization of the synthetic rubber mixture containing it the maximum modulus which is attainable is from 25 to 150 pounds per square inch at 400% elongation. The sealant composition of my invention is vulcanized with the curative until it has a modulus within the indicated range.

I prefer to so adjust the amount of the curative that the maximum modulus attainable upon vulcanization is from 50 to 75 pounds per square inch at 400% elongation and to vulcanize until the sealant layer has such a modulus.

Generally speaking, it is possible to impart to the vulcanizate a modulus of from 25 to 150 pounds per square inch at 400% elongation by the use of an amount of p-quinone-dioxime or carboxylic acid ester thereof within the range of from 0.01 to 0.2 parts by weight per 100 parts of rubber.

It is to be observed that the sealant compounds illustrated in the specific examples below contain no fillers or softeners but that such substances could be added to the recipe without departing from the inventive concept. Generally I use gum stocks or substantially gum stocks, i. e., stocks consisting essentially of rubber and curative, in the practice of my invention.

A marked advantage of the sealant compositions of my invention is that they exhibit excellent sealing properties over a wide range of curing times. Thus the compositions of my invention can be cured for times ranging from 15 to 120 minutes at a temperature corresponding to 60 pounds steam pressure (about 307° F.) or can be cured for equivalent times at other curing temperatures, e. g. at any temperature, of from 275° F. to 350° F. Thus I eliminate both the distintegration in the fuel of the sealant vulcanizate obtained at short times of cure and at the same time I avoid failure to seal at the longer times of cure because of excessive strength and nerve or snappiness of the vulcanizate when swollen by the fuel, because of the curling of the edges of the slit.

It will be understood that when the bullet passes through the wall of the fuel cell the stiffness of the fuel cell walls causes them to spring back closing the tear made by the bullet and bringing the edges of the sealant into register. The fuel then starts to flow through the tear and swells the edges of the sealant layers, rapidly effecting a liquid-tight seal.

The following example illustrates my invention in greater detail. All parts are by weight.

*Example*

A rubbery copolymer of 95% butadiene and 5% styrene, polymerized at 122° F. and designated as X—489, was blended with p-quinonedioxime in varying amounts as shown below. Incorporation of the dioxime was effected by breaking the rubber down on an open mill in the usual way and then intimately blending the dioxime therewith. Samples of the resulting stocks were then vulcanized for 15 and 120 minutes at a temperature corresponding to 60 pounds steam pressure. The vulcanizates were then subjected to a laboratory sealant seal test in which the test fuel (60% isooctane+40% aromatics) was flowed through a slot in a disk of the sealant vulcanizate 0.06 inch in thickness. The test piece was a 1⅝ inch circle with a slot 1/16 inch by 1 inch, which was centered along a diameter. Semi-circular hold-down weights were placed on the test piece with the slot between the weights registering with the slot in the test piece. These weights held the test piece in place so that a seal was effected when the edges of the slot in the test piece pressed together as a result of the swelling. This represented an exaggerated condition in comparison with the bullet tear in the fuel cell and naturally took longer to seal. For room temperature tests a slot of the dimensions indicated was cut in the test piece prior to the test whereas for low temperature testing a slit 1 inch long cut in the test piece was used. The reason for the difference in the room temperature test and the low temperature test is that at room temperature the sealing is ordinarily so rapid that differences in sealing rate would not be detectable were a slit used, whereas at low temperatures the sealing is, generally speaking, so much slower that valid comparisons are obtained using a slit in the test piece.

The data were as follows:

|  | Composition | | | | | Control |
|---|---|---|---|---|---|---|
| X-489 | 100 | 100 | 100 | 100 | 100 | 100 |
| p-Quinone-Dioxime | .125 | .06 | .06 | .03 | .015 | |

PERFORMANCE IN ROOM TEMPERATURE SEALANT SEAL TEST

| Cured 15 minutes | O. K. | O. K. | O. K. | O. K. | O. K. | D |
| Cured 120 minutes | O. K. | O. K. | O. K. | O. K. | O. K. | D |

PERFORMANCE IN −70° C. SEALANT SEAL TEST

| Cured 15 minutes | | | | | O. K. | |
| Cured 120 minutes | O. K. | N. S. | Very Slow | O. K. | O. K. | |

MODULUS, P. S. I., AT 400% ELONGATION

| Cured 15 minutes | 46 | 45 | 52 | 47 | 41 | |
| Cured 120 minutes | 94 | | 72 | 67 | 49 | |

D means that sealant material dissolves in fuel as it swells and does not seal in the sealant seal test.
N. S. means no seal in sealant seal test in 2 or more hours.
O. K. means that the slot or slit is swollen by the fuel and completely seals in the sealant seal test in less than 2 hours.
Very slow denotes a borderline case between "no seal" and "O. K." in the sealant test, i. e., "very slow" means there is a very slow, continuous drip of fuel, which does not stop during the test.

From the foregoing it will be seen that the present invention provides a simple and highly advantageous solution to the problem of crystallization of sealant vulcanizates for fuel cells under extremely low temperature performance conditions. It will also be seen that the invention provides a sealant composition which has highly advantageous sealing properties over a wide curing range so that it is readily adaptable to commercial production conditions. Numerous other advantages of my invention will be readily apparent to those skilled in the art.

Having thus described my invention, what I claim and desire to protect by Letters Patent is:

1. In a bullet-sealing fuel cell, a sealant layer comprising a vulcanizate of non-crystallizable synthetic rubber selected from the group consisting of homopolymers of aliphatic conjugated diolefin hydrocarbons and copolymers of such hydrocarbons with copolymerizable monoolefinic compounds, said synethic rubber having in the uncured state a cohesive energy density of from 56 to 72 and, as the sole vulcanizing agent therefor, a material selected from the group consisting of p-quinone-dioxime and carboxylic acid esters thereof in amount equal to from 0.01 to 0.2 part per 100 parts of said rubber, said vulcanizate having a modulus of from 25 to 150 pounds per square inch at 400% elongation.

2. In a bullet-sealing fuel cell, a sealant layer comprising a vulcanizate of non-crystallizable synthetic rubber selected from the group consisting of homopolymers of aliphatic conjugated diolefin hydrocarbons and copolymers of such hydrocarbons with copolymerizable monoolefinic compounds, said synthetic rubber having in the uncured state a cohesive energy density of from 56 to 72 and, as the sole vulcanizing agent therefor, a material selected from the group consisting of p-quinone-dioxime and carboxylic acid esters thereof in amount equal to from 0.01 to 0.2 part per 100 parts of said rubber, said vulcanizate having a modulus of from 50 to 75 pounds per square inch at 400% elongation.

3. In a bullet-sealing fuel cell, a sealant layer comprising a vulcanizate of a non-crystallizable rubbery copolymer of 95% butadiene and 5% styrene made at approximately 122° F., said copolymer having in the uncured state a cohesive energy density of from 56 to 72 and, as the sole vulcanizing agent therefor, a material selected from the group consisting of p-quinone-dioxime and carboxylic acid esters thereof in amount equal to from 0.01 to 0.2 part per 100 parts of said copolymer, said vulcanizate having a modulus of from 25 to 150 pounds per square inch at 400% elongation.

4. In a bullet-sealing fuel cell, a sealant layer comprising a vulcanizate of a non-crystallizable rubbery copolymer of 95% butadiene and 5% styrene made at approximately 122° F., said copolymer having in the uncured state a cohesive energy density of from 56 to 72, and as the sole vulcanizing agent therefor, p-quinone-dioxime in amount equal to from 0.01 to 0.2 part per 100 parts of said copolymer, said vulcanizate having a modulus of from 50 to 75 pounds per square inch at 400% elongation.

References Cited in the file of this patent

UNITED STATES PATENTS

| Number | Name | Date |
|---|---|---|
| 2,039,401 | Foges | May 5, 1936 |
| 2,411,116 | Sanz | Nov. 12, 1946 |
| 2,446,815 | Davies et al. | Aug. 10, 1948 |
| 2,497,123 | Frolich | Feb. 14, 1950 |
| 2,548,505 | Turner et al. | Apr. 10, 1951 |
| 2,557,641 | Dudley | June 19, 1951 |